United States Patent [19]

Iwasa et al.

[11] Patent Number: 5,456,526
[45] Date of Patent: Oct. 10, 1995

[54] ABS CONTROL FOR INDIVIDUAL AXLES OF A THREE AXLE VEHICLE

[75] Inventors: Yoshihisa Iwasa; Shigeki Tsuchiya; Katsuya Miyake, all of Saitama, Japan

[73] Assignee: Akebono Brake Industry Co., Ltd., Tokyo, Japan

[21] Appl. No.: 157,275

[22] Filed: Nov. 26, 1993

[30] Foreign Application Priority Data

Nov. 27, 1992 [JP] Japan .................................. 4-082155 U
Nov. 27, 1992 [JP] Japan .................................. 4-082156 U

[51] Int. Cl.⁶ .................................................. B60T 8/40
[52] U.S. Cl. ........................ 303/113.5; 303/8; 303/9.69
[58] Field of Search ............................ 303/7, 8, 9.61, 303/9.66, 13, 14, 98, 111, 113.5, 115.1, 119.1, DIG. 3, DIG. 4, 9.69

[56] References Cited

U.S. PATENT DOCUMENTS 5,211,449  5/1993  Amtsfeld ................ 303/113.5 X

FOREIGN PATENT DOCUMENTS 3501381  7/1986  Germany .............................. 303/113.5
58-139853  8/1983  Japan .
9301008  6/1993  WIPO .................................. 303/113.5

Primary Examiner—Josie A. Ballato
Attorney, Agent, or Firm—Finnegan, Henderson, Farabow, Garrett & Dunner

[57] ABSTRACT

A wheel lock prevention system prevents locking of wheels in a vehicle including a front axle having right and left front wheels, a first rear axle having right and left driving wheels, and a second rear axle having right and left follower wheels. A control part determines that locking or skidding of particular wheels may occur based on signals from sensors. In response, the control part transmits a signal to apply the appropriate brake force to the appropriate wheels.

15 Claims, 5 Drawing Sheets

ABS CONTROL FOR INDIVIDUAL AXLES OF A THREE AXLE VEHICLE

BACKGROUND OF THE INVENTION

1. Field of the Invention

The present invention relates to a brake system for use in a vehicle including one front axle and two rear axles and, in particular, to a wheel lock prevention system which prevents the locking of the wheels.

2. Discussion of the Related Art

FIGS. 1 and 2, respectively, show first and second conventional anti-lock brake systems for use in a large-sized vehicle including three axles.

In the first conventional system shown in FIG. 1, the front side axle thereof includes right and left front wheels 151, 152, the first rear axle thereof includes right and left driving wheels 153, 154, and the second rear axle thereof includes right and left follower wheels 155, 156. Also, the first conventional system includes first and second speed sensors S101, S102 which are respectively used to detect the speeds of rotation of the right and left front wheels 151, 152 and, at the same time, includes third and fourth speed sensors S103, S104 respectively used to detect the rotational speeds of the right and left driving wheels 153, 154. The values of the rotational speeds detected by the speed sensors S101–S104 are output as speed signals to a control part (not shown).

As shown further in FIG. 1, a first brake control device part 110 is interposed through a relay valve 108 between a brake valve 107 and the respective wheel cylinders of the right and left front wheels 151, 152. The first brake control device part 110 includes a first air master cylinder 111, which converts air pressure from a brake valve side into the liquid pressure and supplies it to a wheel cylinder side, and a first modulator 112, which controls the liquid pressure to be fed to the first air master cylinder 111. The first modulator 112 can be operated properly in accordance with an operation signal output from the control part.

Similarly, between the brake valve 107 and the respective wheel cylinders of the right drive and follower wheels 153 and 155, through a relay valve 109, there is interposed a second brake control device part 120, which comprises a second air master cylinder 121 and a second modulator 122. The second brake control device part 120 is used to control brake pressures to be applied to the respective wheel cylinders of the right drive and follower wheels 153 and 155.

Further, between the brake valve 107 and the respective wheel cylinders of the left drive and follower wheels 154 and 156, through the relay valve 109, there is interposed a third brake control device part 130, which includes a third air master cylinder 131 and a third modulator 132. The third brake control device part 130 is used to control brake pressures to be applied to the respective wheel cylinders of the left drive and follower wheels 154 and 156.

In the first conventional system, on the front wheel side, the control part carries out a select-low control to operate an operation signal to be applied to the first brake control device part 110 in accordance with the speed signal from one of the right and left front wheels 151, 152 having a lower rotational speed. And, the right driving wheel 153 and right follower wheel 155 are controlled by the second brake control device part 120 independently of the left side wheels. Also, the left driving wheel 154 and left follower wheel 156 are controlled by the third brake control device part 130 independently of the right side wheels.

Next, description will be given below of the second conventional system shown in FIG. 2.

In FIG. 2, parts given the same designations as those in FIG. 1 are similar in structure and operation to those employed in the first conventional system and thus the description thereof is omitted.

In the second conventional system, the right and left follower wheels 155, 156 are not in communication with the second and third brake control device parts 120, 130, respectively, but they are in communication with the first brake control device part 110 on the front wheel side.

Now, in the first conventional system, since the drive and follower wheels on the rear side are controlled by the same pipe (a pipe D interposed between the brake valve 107 and relay valve 109), if the pipe D is defective, then the four wheels 153, 154, 155, 156 on the rear wheel side will fail, which may have serious consequences.

Also, when the first conventional system includes an acceleration skid control mechanism, unless cut valves 161 and 162, each having an electromagnetic valve, are newly interposed, respectively, between the right drive and follower wheels 153, 155 and left drive and follower wheels 154, 156, the same brake pressure applied to prevent skidding of the driving wheels 153, 154 is also supplied to the follower wheels 155, 156. This increases the number of parts and the costs of the system.

In the second conventional system, since the follower wheels 155, 156 are braked in accordance with the speed signals of the front wheels during the anti-lock control operation, the possibility of the follower wheels 155, 156 locking increases, and the braking performance and stability of the vehicle deteriorates.

SUMMARY OF THE INVENTION

The present invention has been made in view of the above circumstances and has as an object to provide a wheel lock prevention system which has a good anti-lock performance.

A further object of the present invention is to provide a system including an anti-lock mechanism at low cost.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, in a vehicle including a front axle having right and left front wheels, a first rear axle having right and left driving wheels, and a second rear axle having right and left follower wheels, the wheel lock prevention system of this invention comprises a first brake control device part for controlling brake force applied to said right and left front wheels, a second brake control device part for controlling brake force applied to said left driving wheel, a third brake control device part for controlling brake force applied to said right driving wheel, a fourth brake control device part for controlling brake force applied to said right and left follower wheels, first to sixth detecting means for detecting the rotational speeds of, respectively, said right and left front wheels, said right and left driving wheels, and said right and left follower wheels, and a control part for inputting signals from each of said detecting means, wherein if said control part determines that locking of said right and left front wheels may occur based on signals from said first and second detecting means, then said control part controls said first brake control device part, wherein if said control part determines that locking of said left driving wheel may occur based on a signal from said third detecting means, then said control part controls said second brake control device part, wherein if said control part determines that locking of said right driving wheel may occur based on a signal from said fourth detecting means, then said control part controls said third brake control device part, and wherein if said control part determines that locking of said right and left follower wheels may occur based on signals from said fifth and sixth detecting means, then said control part controls said fourth brake control device part.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

At first, description will be given below of a first embodiment of a wheel lock prevention system with reference to FIGS. 3 to 5.

Figure 4:
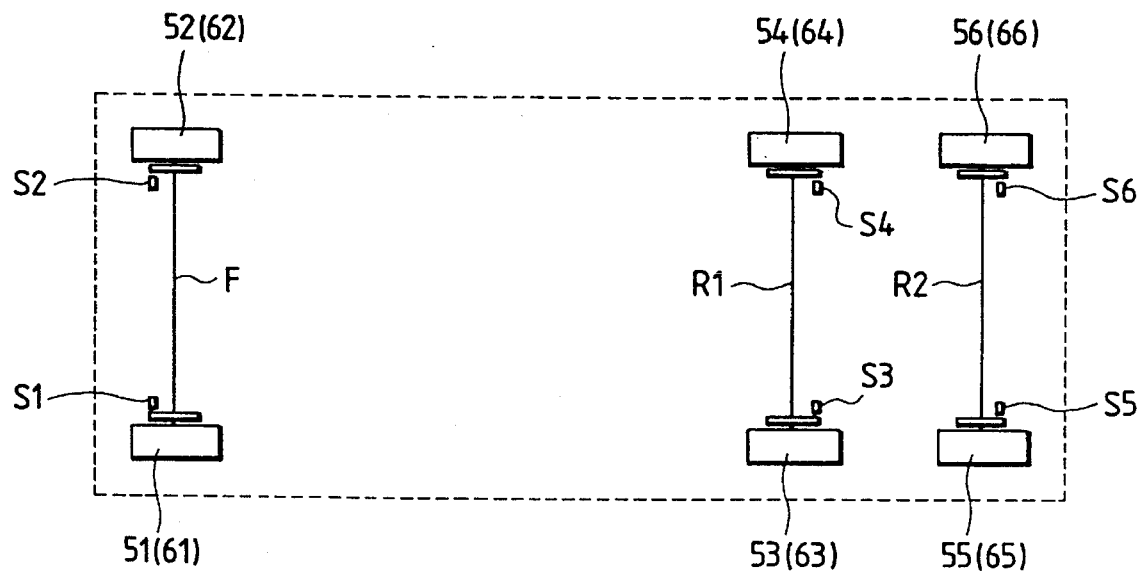
FIG. 4 shows the arrangement of wheel axles employed in the first embodiment of the present invention.

The wheel lock prevention system according to the first invention includes three axles as shown in FIG. 4; that is, a front axle F on the front side thereof and a first rear axle R1 and a second rear axle R2 on the rear side thereof.

The front axle F includes a right front wheel 51 and a left front wheel 52. Also, the first rear axle R1 includes a right driving wheel 53 and a left driving wheel 54, while the second rear axle R2 includes a right follower wheel 55 and a left follower wheel 56. The right front wheel 51 includes a wheel cylinder 61 and the left front wheel 52 includes a wheel cylinder 62. Further, the right driving wheel 53 includes a wheel cylinder 63, while the left driving wheel 54 includes a wheel cylinder 64. Moreover, the right follower wheel 55 includes a wheel cylinder 65 and the left follower wheel 56 includes a wheel cylinder 66.

And, there are provided first to sixth speed sensors S1–S6 for detecting the rotational speeds of their respective wheels. The speed sensors S1–S6 are arranged such that they calculate their respective speed values in accordance with the amount of rotation of their respective wheels.

Figure 1:
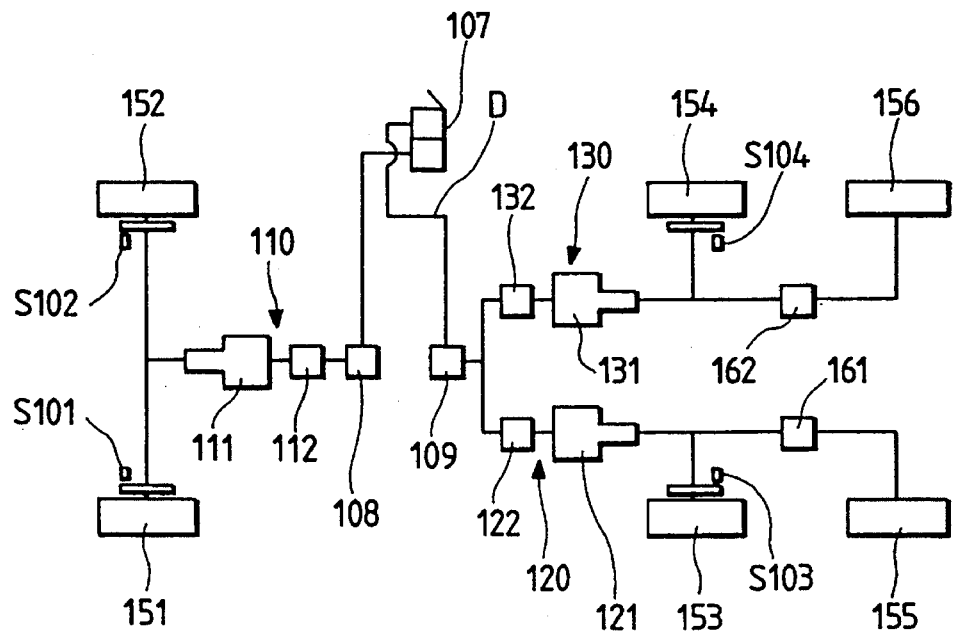
FIG. 1 is a block diagram of the structure of a first conventional wheel lock prevention system.
Figure 2:
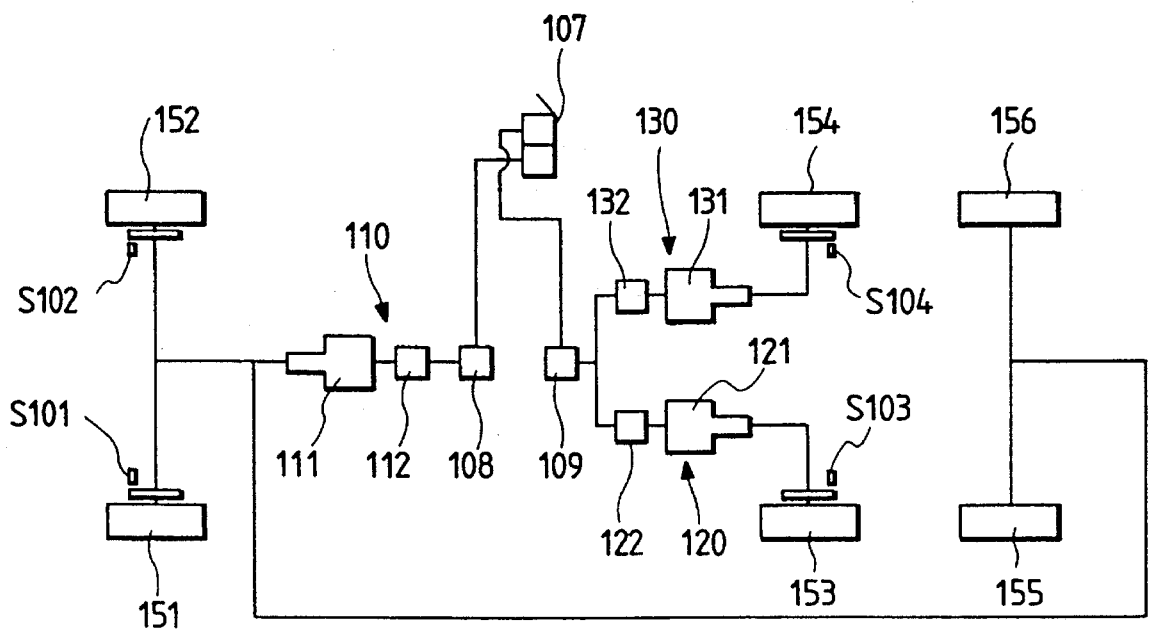
FIG. 2 is a block diagram of the structure of a second conventional wheel lock prevention system.
Figure 3:
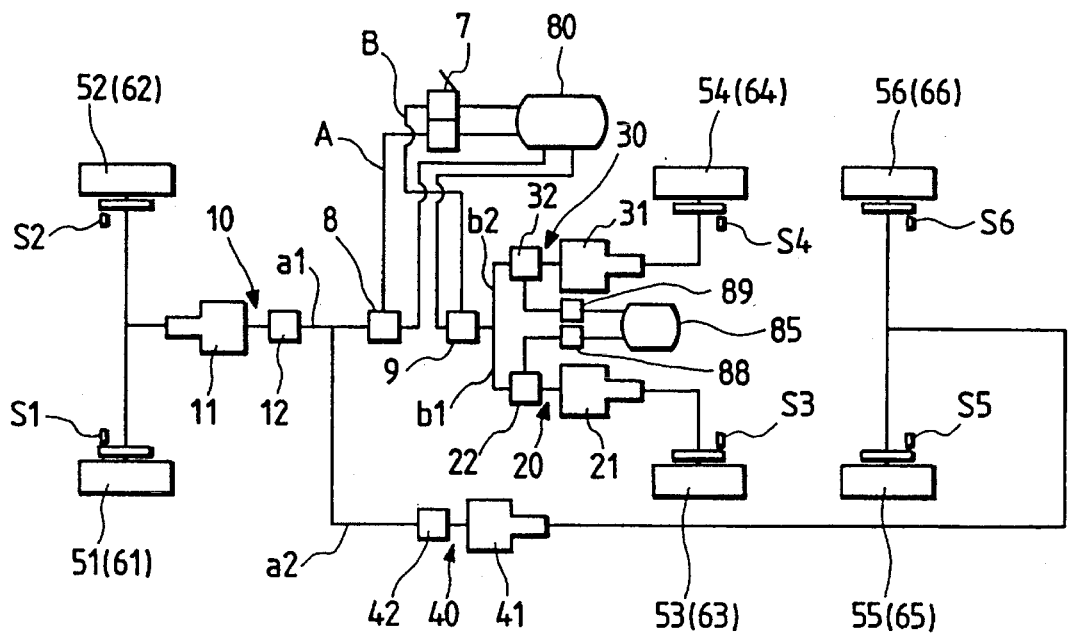
FIG. 3 is a block diagram of the structure of a first embodiment of a wheel lock prevention system according to the present invention.

With reference to FIG. 3, description will be given below of a piping arrangement for brake pressures to be applied in order to brake the vehicle in accordance with a first embodiment of the invention.

An air tank 80 communicates with a brake valve 7, which can be opened and closed via a brake pedal operated by a driver. The brake valve 7 is connected with a relay valve 8 provided on the front wheel side via a first pipe A and is also connected with a relay valve 9 on the rear wheel side by means of a second pipe B.

The relay valve 8 further communicates, through a front wheel pipe a1, with a first brake control device part 10, which is used to supply brake pressures to the respective wheel cylinders 61, 62 of the right and left front wheels 51, 52. Also, a follower wheel pipe a2, which branches off from the front wheel pipe a1, is in communication with a fourth brake control device part 40, which is used to supply brake pressure to the respective wheel cylinders 65, 66 of the right and left follower wheels 55, 56.

The relay valve 9 communicates, through a left driving wheel pipe b1, with a second brake control device part 20, which is used to supply a brake pressure to the wheel cylinder 63 of the right driving wheel 53. Also, the relay valve 9 is in communication, through a right driving wheel pipe b2 branching off from the left driving wheel pipe b1, with a third brake control device part 30 used to supply a brake pressure to the wheel cylinder 64 of the left driving wheel 54.

The first brake control device part 10 comprises a first air master cylinder 11, which is used to convert air pressure from the brake valve 7 side into liquid pressure and to supply the liquid pressure to the wheel cylinder side, and a first modulator 12 used to control the liquid pressure to be applied to the air master cylinder 11. The first modulator 12 is arranged such that it can be operated properly in accordance with an operation signal from a control part 90 to be described in more detail below with reference to FIGS. 5 and 8.

Similarly, the second brake control device part 20 comprises a second air master cylinder 21 and a second modulator 22, while the third brake control device part 30 comprises a third air master cylinder 31 and a third modulator 32. Also, the fourth brake control device part 40 includes a fourth air master cylinder 41 and a fourth modulator 42.

Also, the wheel lock prevention system according to the first embodiment of the invention includes an air tank 85 which serves as a second air pressure source. The air tank 85 is in communication with the second modulator 22 through a first traction control valve 88, and is also in communication with the third modulator 32 through a second traction control valve 89. The first and second traction control valves 88, 89 are respectively arranged such that they can supply the air from the air tank 85 to the second and third modulators 22, 32 in accordance with an operation signal from the control part 90.

The brake pressures to be supplied to the wheel cylinders of the respective wheels can be transmitted in the following manner.

That is, when the pressure is supplied to the wheel cylinders 61, 62 respectively provided on the front wheel side, the air from the air tank 80 passes through the brake valve 7 and arrives at the relay valve 8 as a signal pressure, the relay valve 8 takes in an air pressure directly corresponding to the signal pressure from the air tank 80 and then supplies the air pressure through the first modulator 12 to the first air master cylinder 11, and the first air master cylinder 11 converts the air pressure into a liquid pressure and then applies the liquid pressure to the wheel cylinders 61, 62 on the front wheel side.

Also, when the pressure is to be applied to the wheel cylinders 63, 64, the air from the air tank 80 passes through the brake valve 7 and arrives at the relay valve 9 as a signal pressure, the relay valve 9 takes in an air pressure corresponding to the signal pressure directly from the air tank 80, and then supplies the air pressure to the second and third modulators 22 and 32. The air that has passed through the second modulator 22 is then supplied to a second air master cylinder 21. The second air master cylinder 21 converts the air pressure into a liquid pressure and then supplies the liquid pressure to the wheel cylinder 63. Similarly, the air that has passed through the third modulator 32 is then fed to a third air master cylinder 31. The third air master cylinder 31 converts the air pressure into a liquid pressure and then feeds the liquid pressure to the wheel cylinder 64.

Further, when the pressure is to be applied to the wheel cylinders 65, 66 respectively provided on the follower wheel side, the air from the air tank 80 passes through the brake valve 7 and arrives at the relay valve 8 as a signal pressure, the relay valve 8 takes in an air pressure directly corresponding to the signal pressure from the air tank 80 and then supplies the air pressure through the fourth generator 42 to the fourth air master cylinder 41, and the fourth air master cylinder 41 converts the air pressure into a liquid pressure and then applies the liquid pressure to the wheel cylinders 65, 66 on the follower wheel side.

During traction control, air from an air tank 85 is fed through a first traction control valve 88 and second modulator 22 to the second air master cylinder 21, and then the air master cylinder 21 converts the air pressure into a liquid pressure and then supplies the liquid pressure to the wheel cylinder 63. Further, air from the air tank 85 is supplied through a second traction control valve 89 and third modulator 32 to the third air master cylinder 31, and then the air master cylinder 31 converts the air pressure into a liquid pressure and then feeds the liquid pressure to the wheel cylinder 64.

Figure 5:
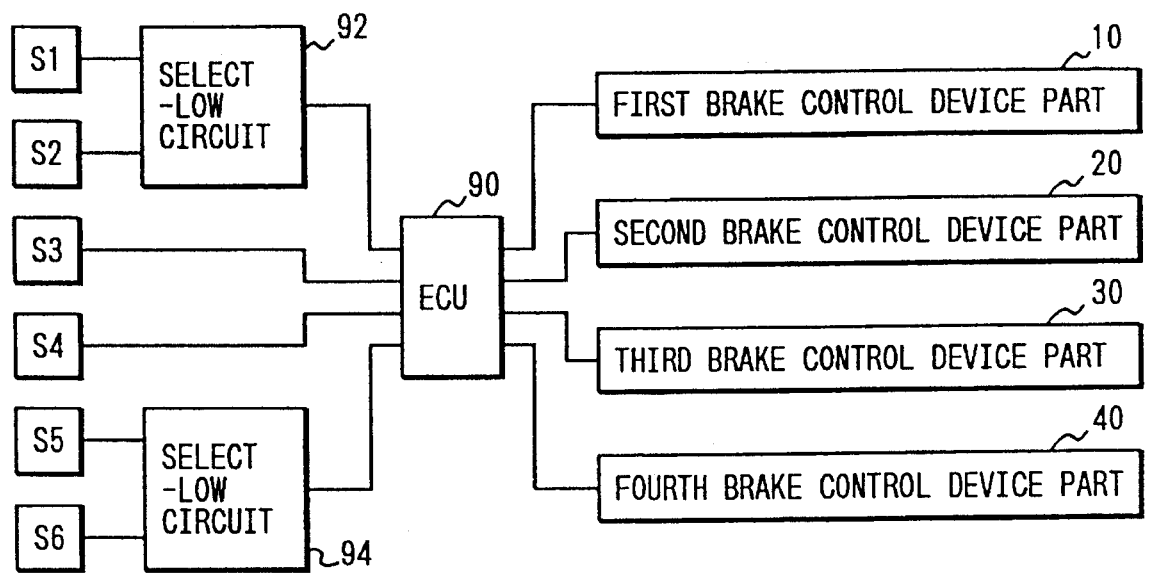
FIG. 5 is a block diagram of parts employed in the first embodiment of the present invention.

The first to sixth speed sensors S1–S6, as shown in FIG. 5, are respectively connected to the control part 90 (ECU). Hold valves (not shown) and decay valves (not shown) respectively provided in the first to fourth brake control device parts 10, 20, 30, 40 are properly opened and closed in accordance with signals from the control part 90 to thereby prevent the wheels from locking.

Signals from the first and second speed sensors S1, S2 are output to the control part 90 through a select-low circuit 92. The select-low circuit 92 selects one of the first and second speed sensors S1 and S2, that is, selects the speed signal thereof that is lower than the other and then outputs the lower speed signal to the control part 90. That is, the speed signal of one of the right and left front wheels 51, 52 which has a higher possibility of locking is selected. Similarly, in the case of signals from the fifth and sixth speed sensors S5, S6, the speed signal of one of them that is lower than the other is selected by a select-low circuit 94 and is then output to the control part 90. As a result of this, only the speed signal of one of the right and left follower wheels 55, 56 having a higher possibility of locking is output to the control part 90.

If the control part 90 finds a possibility of locking of the front wheels in accordance with a signal from the first speed sensor S1 or from the second speed sensor S2, then the control part 90 controls the pressure in the first air master cylinder 11 by means of the first modulator 12 to adjust the liquid pressures in the wheel cylinders 61, 62, thereby preventing the front wheels from locking.

Also, if the control part 90 finds a possibility of locking of the right driving wheel 53 in accordance with a speed signal from the third speed sensor S3, then the control part 90 controls the pressure in the second air master cylinder 21 by means of the second modulator 22 to adjust the brake pressure in the wheel cylinder 63, thereby preventing the right driving wheel 53 from locking.

If the control part 90 finds a possibility of locking of the left driving wheel 54 in accordance with a speed signal from the fourth speed sensor S4, then the control part 90 controls the pressure in the third air master cylinder 31 by means of the second modulator 32 to adjust the brake pressure in the wheel cylinder 64, thereby preventing the left driving wheel 54 from locking.

Further, if the control part 90 finds a possibility of locking of the follower wheels 55, 56 in accordance with speed signals from the fifth and sixth speed sensors S5 and S6, then the control part 90 controls the pressure in the fourth air master cylinder 41 by means of the fourth modulator 42 to adjust the liquid pressure in the wheel cylinders 65 and 66, thereby preventing the follower wheels 55, 56 from locking.

Moreover, when the vehicle starts, if the control part 90 detects the excessive rotation of the right driving wheel 53 in accordance with a signal from the third speed sensor S3, then the control part 90 opens the first traction control valve 88 to apply a brake pressure to the wheel cylinder 63 forcibly, thereby preventing the right driving wheel 53 from skidding. In other words, by applying the air pressure from the first traction control valve 88 to the second modulator 22, the control part 90 operates the hold valves and decay valves in the second modulator 22 properly to adjust the liquid pressure in the wheel cylinder 63, thereby applying to the right driving wheel 53 a brake force necessary to prevent the acceleration skidding of the right driving wheel 53.

Similarly, when the vehicle starts, if the control part 90 detects the skidding of the left driving wheel 54 in accordance with a speed signal from the fourth speed sensor S4, then the control part 90 controls the second traction control valve 89 and third modulator 33 properly to thereby prevent the acceleration skidding of the left driving wheel 54.

Next, description will be given below of the operation of the first embodiment of the invention structured in the above-mentioned manner.

If the brake valve 7 is opened by operation of a brake pedal, then signal pressure from the first pipe A causes air pressure to be supplied through the relay valve 8 to the first and fourth brake control device parts 10 and 40. In response, the first brake control device part 10 is operated to supply brake pressure to the wheel cylinders 61, 62 on the side of the front wheels 51, 52 and, at the same time, the fourth brake control device part 40 is operated to supply brake pressure to the wheel cylinders 65, 66 on the side of the follower wheels 55, 56.

Simultaneously, signal pressure from the second pipe B causes air pressure to be supplied through the relay valve 9 to the second and third brake control device parts 20 and 30. In response, the second brake control device part 20 is operated to supply the brake pressure to the wheel cylinder 63 of the right driving wheel 53 and, at the same time, the third brake control device part 30 is operated to supply the brake pressure to the wheel cylinder 64 of the left driving wheel 54. In this manner, the braking of the respective wheels can be achieved.

During braking, if the control part 90 finds a possibility of locking of at least one of the front wheels 51, 52 in accordance with the signals from the first and second speed sensors S1, S2, then the control part 90 outputs an operation signal to the first brake control device part 10. In accordance with an instruction signal from the control part 90, the first brake control device part 10 properly reduces, maintains or increases the brake pressure supplied to the wheel cylinders 61, 62 to thereby be able to prevent the front wheels 51, 52 from locking.

Also, if the control part 90 finds a possibility of locking of at least one of the follower wheels 55, 56 in accordance with the signals from the fifth and sixth speed sensors S5, S6, then the control part 90 outputs an operation signal to the fourth brake control device part 40. In accordance with an instruction signal from the control part 40, the fourth brake control device part 40 properly reduces, maintains or increases the brake pressure to be supplied to the wheel cylinders 65, 66 to thereby prevent the follower wheels 55, 56 from locking. In this manner, the brake pressure to the right and left follower wheels 55, 56 can be controlled independently of the front wheels and driving wheels.

If the control part 90 finds a possibility of locking of the right driving wheel 53 in accordance with the signal from the third speed sensor S3, then the control part 90 outputs an operation signal to the second brake control device part 20. In accordance with an instruction signal from the control part 90, the second brake control device part 20 properly reduces, maintains or increases the brake pressure to be supplied to the wheel cylinder 63 to thereby prevent the right driving wheel 53 from locking.

Further, if the control part 90 finds a possibility of locking of the left driving wheel 54 in accordance with the signal from the fourth speed sensor S4, then the control part 90 outputs an operation signal to the third brake control device part 30. In accordance with an instruction signal from the control part 90, the third brake control device part 30 properly reduces, maintains, or increases the brake pressure to be supplied to the wheel cylinder 64 to thereby prevent the left driving wheel 54 from locking.

Also, when the vehicle starts, if the control part 90 detects the skidding of the right driving wheel 53 in accordance with the signal from the third speed sensor S3, then the control part 90 outputs an operation signal to the first traction control valve 88 and second brake control device part 20. In response, the second brake control device part 20 properly adjusts the air pressure to be supplied from the first traction control valve 88 to thereby prevent the acceleration skidding of the right driving wheel 53. Similarly, when the vehicle starts, if the control part 90 detects the excessive rotation of the left driving wheel 54 in accordance with the signal from the fourth speed sensor S4, then the control part 90 outputs an operation signal to the second traction control valve 89 and third brake control device part 30. In response, the third brake control device part 30 properly adjusts the air pressure to be supplied from the second traction control valve 89 to thereby prevent the acceleration skidding of the left driving wheel 54.

Next, description will be given below of a second embodiment of a wheel lock prevention system according to the invention with reference to FIGS. 6 to 11.

In the second embodiment, the same parts as those used in the first embodiment shown in FIGS. 3 to 5 are given like reference characters and thus the description thereof is omitted here.

In the second embodiment, first to fourth speed sensors S1–S4, which detect the rotational speeds of the front wheels and driving wheels, are provided in the right and left front wheels 51, 52 and right and left driving wheels 53, 54, respectively. The speed sensors S1–S4 are arranged such that they can calculate the speed values in accordance with the amounts of rotation of the respective wheels. Unlike the first embodiment, in the second embodiment, the fifth and sixth speed sensors S5–S6 are not provided.

The relay valve 8 is in communication, through a pipe a, with the first brake control device part 10 which supplies the brake pressure to the wheel cylinders 61, 62 and wheel cylinders 65, 66.

The first brake control device part 10 is in communication with the wheel cylinders 61, 62 through a pipe C for the front wheels. Also, a pipe D for the follower wheels, which branches off from the front wheels pipe C, is connected with the wheel cylinders 65, 66 through a proportioning valve 70, which controls the brake pressure to the wheel cylinders 65, 66.

The proportioning valve 70 is arranged such that, if the input liquid pressure thereof is equal to or more than a set pressure value, then a valve (not shown) incorporated therein operates to reduce the output liquid pressure thereof at a given ratio. Also, the proportioning valve 70 includes a mechanism to detect the live load of the vehicle and thus, as the live load increases, the set pressure value to start the reduction output increases. That is, if the brake pressure to be supplied to the follower wheel side exceeds a set pressure value, a brake pressure lower than the brake pressure fed to the front wheel side is supplied to the follower wheel side.

In the case of the pressure fed to the wheel cylinders 65, 66 on the follower wheel side, the air from the air tank 80 passes through the brake valve 7 and then arrives at the relay valve 8 as a signal pressure, the relay valve 8 takes in air pressure corresponding to the signal pressure directly from the air tank 80 and then supplies the air pressure through the first modulator 12 to the first air master cylinder 11, the first air master cylinder 11 converts the air pressure into a liquid pressure and then supplies the liquid pressure through the proportioning valve 70 to the wheel cylinders 65, 66 on the follower wheel side.

Figure 8:
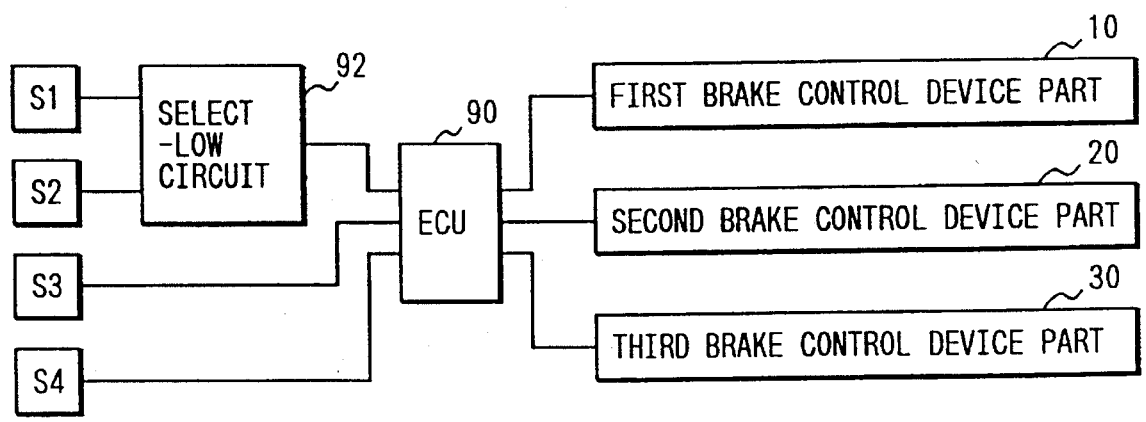
FIG. 8 is a block diagram of parts employed in the second embodiment of the present invention.
Figure 6:
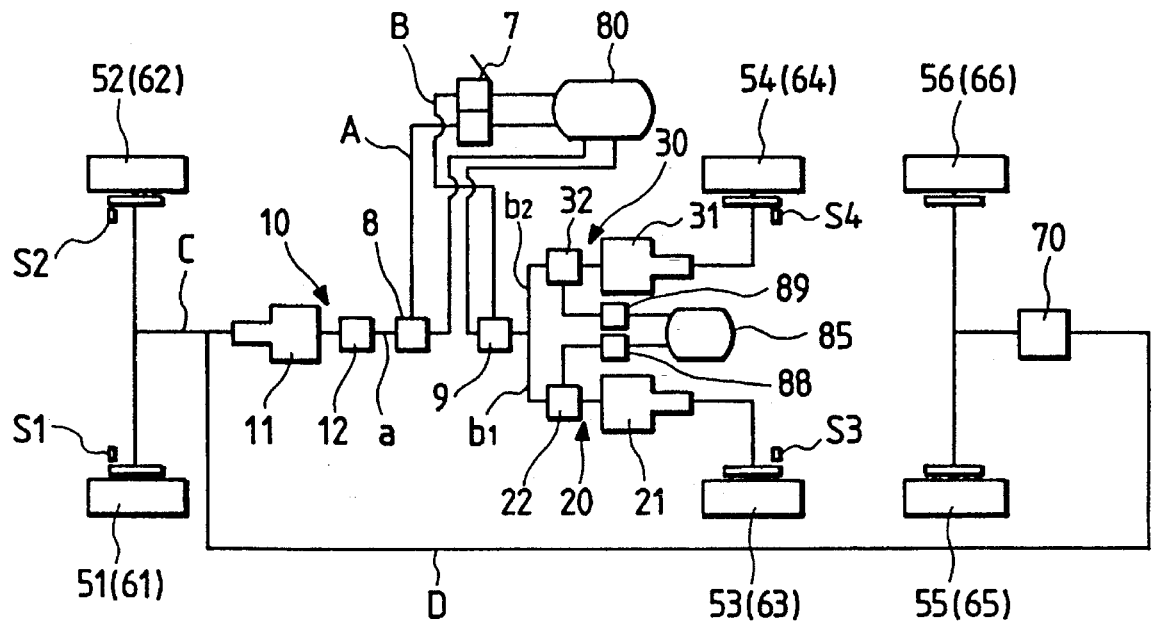
FIG. 6 is a block diagram of the structure of a second embodiment of a wheel lock prevention system according to the present invention.
Figure 7:
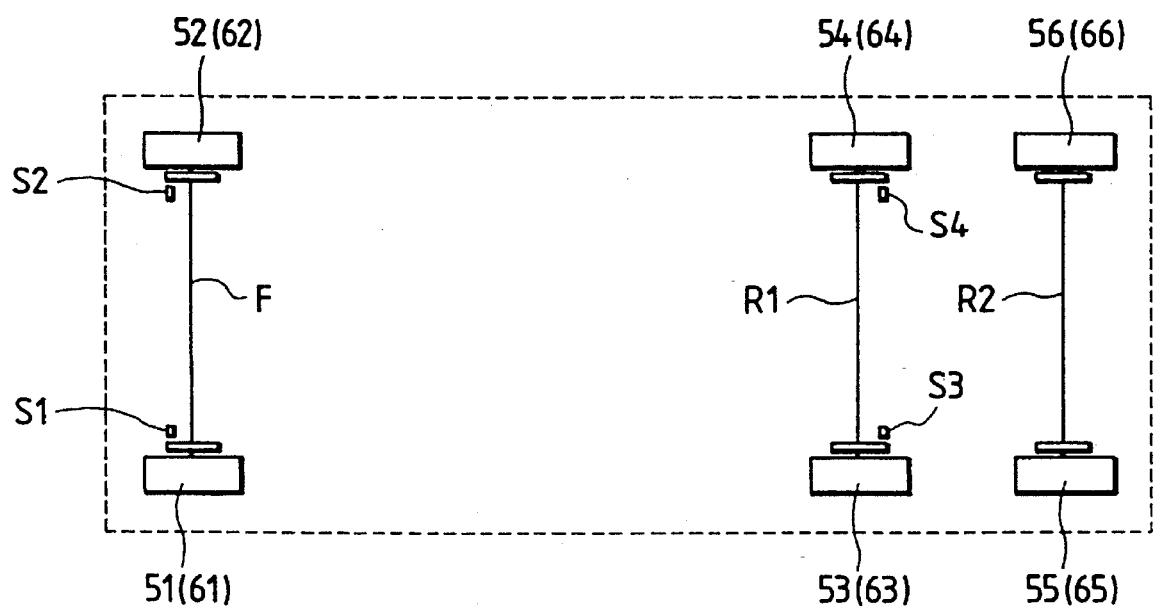
FIG. 7 shows the arrangement of wheel axles employed in the second embodiment of the present invention.

The first to fourth speed sensors S1–S4, as shown in FIG. 8, are respectively connected to a control part 90 (ECU). Hold valves (not shown) and decay valves (not shown) included in the respective modulators of the first to third brake control device parts 10, 20, 30 can be properly opened and closed in accordance with a signal from the control part 90, thereby preventing the wheels from locking.

Next, description will be given below of the operation of the second embodiment structured in the above-mentioned manner.

If the brake valve 7 is opened by operation of a brake pedal, then the air pressure corresponding to a signal pressure from the first pipe A is supplied through valve 8 to the first brake control device part 10. And, the first brake control device part 10 supplies the brake pressure to the wheel cylinders 61, 62 of the front wheels 51, 52 and also supplies the brake pressure to the wheel cylinders 65, 66 of the follower wheels 55, 56.

During braking, if the control part 90 finds a possibility of locking of at least one of the front wheels 51, 52 in accordance with signals from the first and second speed sensors S1, S2, then the control part 90 outputs an operation signal to the first brake control device part 10. In accordance with the instruction signal from the control part 90, the first brake control device part 10 properly reduces, maintains or increases the brake pressure supplied to the wheel cylinders 61, 62 through the front wheel pipe C to thereby prevent the front wheels 51, 52 from locking. At the same time, the brake pressure to be supplied in the direction of the wheel cylinders 65, 66 through the follower wheel pipe D is controlled similarly to the front wheel side.

While such braking is being applied, if the pressure to be supplied from the first brake control device part 10 to the follower wheel side is less than the set pressure value, then the pressure from the first brake control device part 10 is supplied through the proportioning valve 70 to the wheel cylinders 65, 66 to thereby brake the right and left follower wheels 55, 56.

Figure 9:
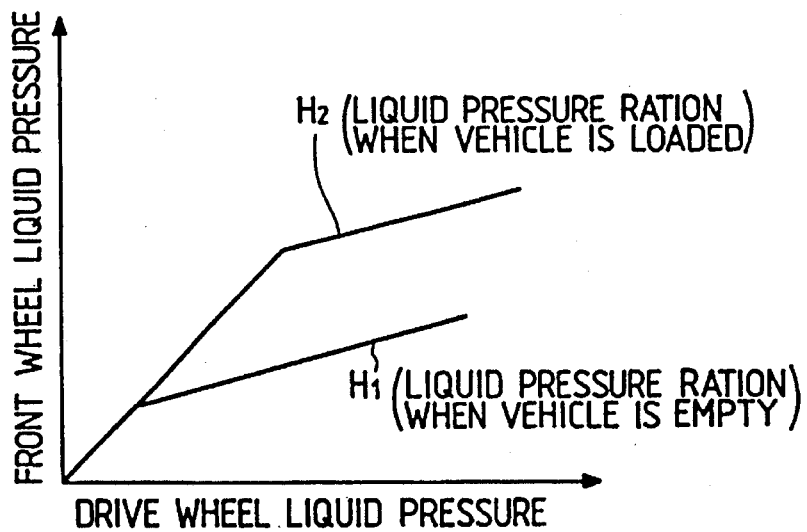
FIG. 9 is a graphical representation of a liquid pressure ratio between the front and follower wheels in the second embodiment of the present invention.

If the pressure to be supplied from the first brake control device part 10 to the follower wheel side exceeds the set pressure value, then the pressure from the first brake control device part 10 is reduced at a given ratio in the proportioning valve 70 and is then supplied to the wheel cylinders 65, 66. That is, when the vehicle slows down, the weight of the vehicle is loaded more heavily in the front portion than in the rear portion due to the force of inertia. For this reason, if the wheels of the vehicle are braked at the same pressure, then the follower wheels are more likely to lock than the front wheels. In view of this, as shown in FIG. 9, by use of the proportioning valve 70, the brake pressure to be applied to the follower wheels can be reduced, when compared with the brake pressure to be supplied to the front wheels, before it is supplied. In FIG. 9, reference character $H_1$ shows a liquid pressure ratio between the front wheels and follower wheels when the vehicle is not loaded. Also, $H_2$ shows a liquid pressure ratio between the front wheels and follower wheels when the vehicle is loaded.

Figure 10:
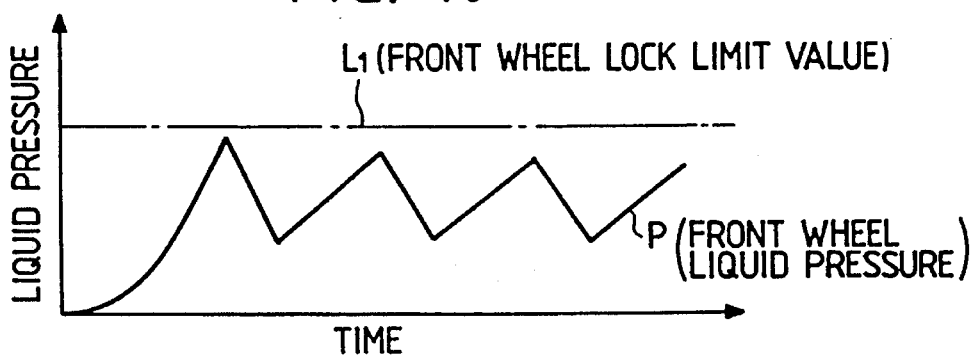
FIG. 10 is a graphical representation of the liquid pressure of the front wheels in the second embodiment of the present invention; and, FIG. 11 is a graphical representation of the liquid pressure of the follower wheels in the second embodiment of the present invention.

FIG. 10 is a graphical representation which shows a front wheel liquid pressure during the anti-lock control. $L_1$ represents the level of the lock limit liquid pressure of the front wheels 51, 52. The liquid pressure P of the wheel cylinders 51, 52 of the front wheels 51, 52 is controlled by the control part 90 for braking in such a manner that it does not exceed the lock limit value, that is, in such a manner that the front wheels 51, 52 can be prevented from locking.

Figure 11:
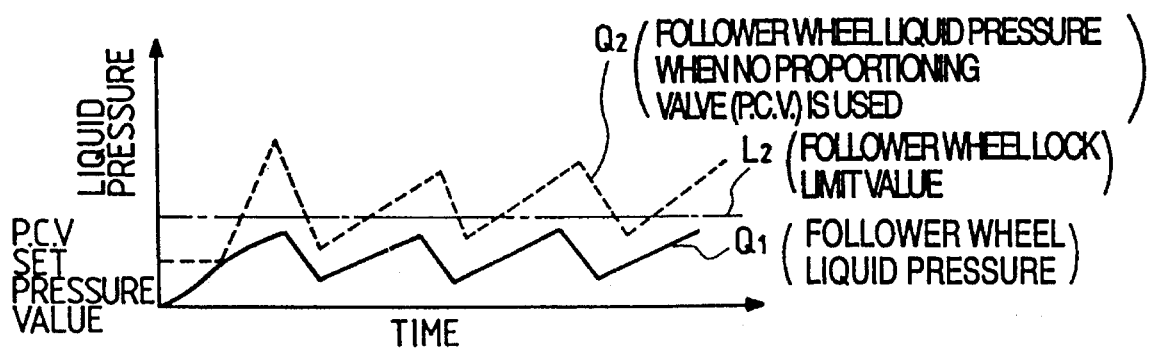

FIG. 11 is a graphical representation which shows a follower wheel liquid pressure during the anti-lock control. In FIG. 11, $L_2$ represents the level of the lock limit liquid pressure of the follower wheels 55, 56. The liquid pressure $Q_1$ of the wheel cylinders 65, 66 of the follower wheels 55, 56 in the present embodiment is controlled so that it does not exceed the lock limit value $L_2$ as shown in FIG. 11. Here, if the proportioning valve 70 is not provided in the follower wheel pipe D, then the liquid pressure of the wheel cylinders 65, 66 is identical with the front wheel liquid pressure P which is shown as $Q_2$. In other words, if the proportioning valve 70 is not applied, then the liquid pressure of the follower wheel side exceeds the lock limit value $L_2$, which causes the follower wheels 55, 56 to lock. Therefore, in order to prevent the locking of the follower wheels which have the lower lock limit liquid pressure value than the front wheels 51, 52, a brake pressure, which is reduced when compared with the brake pressure to the front wheels, is supplied to the follower wheels 55, 56.

Here, because the lock limit liquid pressure value varies according to the live load of the vehicle, it is desirable that the liquid pressure $Q_1$ of the wheel cylinders 65, 66 may also be varied according to the variations of the lock limit liquid pressure value. Thus, the set pressure value, at which the reduction of the pressure of the proportioning valve 70 begins, is varied. That is, as the live load of the vehicle increases, the operation starting point of a valve incorporated in the proportioning valve 70 is delayed. This makes it possible to perform a good anti-lock control on the follower wheels 55, 56 according to the live load of the vehicle.

In the second embodiment, as described above, a proportioning valve 70 is employed which can be used to vary the set pressure value according to the live load (of the vehicle). However, alternatively, there may be provided a proportioning valve which keeps the set pressure value at a fixed level.

Also, a proportioning valve can be used that detects the vehicle deceleration speed to thereby vary the set pressure value (for example, a proportioning valve in Japanese Patent Publication No. 58-139853 of Showa).

If the control part 90 finds a possibility of locking of the right driving wheel 53 in accordance with the signal from the third speed sensor S3, then the control part 90 outputs an operation signal to the third brake control device part 30. In response to the instruction signal from the control part 90, the third brake control device part 30 properly reduces, maintains, or increases the brake pressure to be supplied to the wheel cylinder 63 to thereby prevent the right driving wheel 53 from locking.

Further, if the control part 90 finds a possibility of locking of the left driving wheel 54 in accordance with the signal from the fourth speed sensor S4, then the control part 90 outputs an operation signal to the fourth brake control device part 40. In response to the instruction signal from the control part 90, the fourth brake control device part 40 properly reduces, maintains, or increases the brake pressure to be supplied to the wheel cylinder 64 to thereby prevent the left driving wheel 54 from locking.

As described above, according to the second embodiment of the invention, if the brake pressure to be applied to the follower wheels of the second rear axle exceeds the set pressure value, then a brake pressure less than the brake pressure applied to the front wheels is supplied to the follower wheels. This prevents the follower wheels from locking.

As described above, according to the present embodiment, the brake pressure applied to the follower wheels of the second rear axle can be directly controlled separately from the brakes to be applied to the front wheels and driving wheels. This prevents the follower wheels from locking.

Also, even when a wheel lock prevention system includes a traction control mechanism, the need to interpose a cut valve or the like between the drive and follower wheels is eliminated, thereby reducing the number of parts. This makes it possible to supply an inexpensive system.

Further, even if any defect occurs in the second pipe provided on the driving wheel side, the brake pressure can be supplied to the front wheels and follower wheels, so that the safety of the system can be improved.

In the present embodiment, the speed signal of the front wheel side and the speed signal of the follower wheel side are input to the control part 90 respectively through the separate select-low circuits. However, alternatively, it is also possible to incorporate the functions of the respective select-low circuits in the control part 90.

Also, in the present embodiment, there is employed an air-over hydraulic brake system which converts the air pressure into the liquid pressure and supplies the liquid brake pressure to the wheel cylinders. Alternatively, however, the invention can also apply to a full air brake system.

According to the invention, in a vehicle including three axles, it is possible to provide a wheel lock prevention system including a good anti-lock performance at low cost.

In the above-mentioned embodiment, the speed signal of the front wheel side is input through the select-low circuit to the control part 90. However, alternatively, it is also possible to incorporate the function of the select-low circuit in the control part 90.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A wheel lock prevention system for a vehicle including a front axle having right and left front wheels, a first rear axle having right and left driving wheels, and a second rear axle having right and left follower wheels, the system comprising:

means for generating brake force;

a first brake control device for controlling the brake force applied to said right and left front wheels;

a second brake control device for controlling the brake force applied to said right driving wheel;

a third brake control device for controlling the brake force applied to said left driving wheel;

first and second detecting means for detecting the rotational speeds of said right and left front wheels, respectively;

third and fourth detecting means for detecting the rotational speeds of said right and left driving wheels, respectively;

a proportioning device including means for receiving brake pressure from the first brake control device and means for applying a corresponding brake pressure to the follower wheels, the corresponding brake pressure being less than a threshold pressure value, said proportioning device further including means for determining the threshold pressure value corresponding to a live load of the vehicle; and a controller for inputting signals from each of said detecting means and outputting respective control signals to corresponding brake control devices.

2. A wheel lock prevention system as set forth in claim 1, further comprising:

fourth brake control device for controlling the brake force applied to said right and left follower wheels; and fifth and sixth detecting means for detecting the rotational speeds of said right and left follower wheels.

3. A wheel lock prevention system as set forth in claim 2, wherein said controller includes means for determining whether said right and left follower wheels will lock or skid based on signals from said fifth and sixth detecting means, said controller including means for outputting a corresponding control signal to said fourth brake control device to prevent locking or skidding of said follower wheels.

4. A wheel lock prevention system as set forth in claim 2, further comprising a select-low circuit for receiving rotational speeds of the right and left follower wheels through the fifth and sixth detecting means and for outputting a lower rotational speed of the right and left follower wheels to the controller, the controller outputting a corresponding signal to the fourth brake control device.

5. A wheel lock prevention system as set forth in claim 2, further comprising:

means for controlling said front wheels and said follower wheels independently of each other; and means for controlling said right and left driving wheels independently of each other.

6. A wheel lock prevention system as set forth in claim 1, wherein said controller includes means for determining whether said at least one of right and left front wheels will lock or skid based on signals from said first and second detecting means, said controller outputting a corresponding control signal to said first brake control device to prevent locking or skidding of said front wheels.

7. A wheel lock prevention system as set forth in claim 1, wherein said controller includes means for determining whether said right driving wheel will lock or skid based on a signal from said third detecting means, said controller outputting a corresponding control signal to said second brake control device to prevent locking or skidding of said right driving wheel.

8. A wheel lock prevention system as set forth in claim 1, wherein said controller includes means for determining whether said left driving wheel will lock or skid based on a signal from said fourth detecting means, said controller outputting a corresponding control signal to said third brake control device to prevent locking or skidding of said left driving wheel.

9. A wheel lock prevention system as set forth in claim 1, further comprising a select-low circuit for receiving rotational speeds of the right and left front wheels through the first and second detecting means and outputting a lower rotational speed of the right and left front wheels to the controller, the controller outputting a corresponding signal to the first brake control device.

10. A wheel lock prevention system as set forth in claim 1, further comprising:

means for controlling said front wheels and said follower wheels independently of each other; and means for controlling said right and left driving wheels independently of each other.

11. A wheel lock prevention system as set forth in claim 1, wherein each the first, second, and third brake control devices includes a modulator.

12. A wheel lock prevention system as set forth in claim 11, wherein each of the first, second, and third brake control devices further includes an air master cylinder.

13. A wheel lock prevention system for a vehicle including a front axle having right and left front wheels, a first rear axle having right and left driving wheels, and a second rear axle having right and left follower wheels, the system comprising:

means for generating brake force;

a first brake control device for commonly controlling the brake force applied to said right and left front wheels;

a second brake control device for controlling the brake force applied to said right driving wheel;

a third brake control device for controlling the brake force applied to said left driving wheel;

a fourth brake control device for commonly controlling the brake force applied to said right and left follower wheels;

first and second detecting means for detecting the rotational speeds of said right and left front wheels, respectively;

third and fourth detecting means for detecting the rotational speeds of said right and left driving wheels, respectively;

fifth and sixth detecting means for detecting the rotational speeds of said right and left follower wheels, respectively;

a controller for receiving signals from each of said first, second, third, fourth, fifth, and sixth detecting means and for outputting corresponding control signals to the first, second, third, and fourth brake control devices; and a proportioning device including means for receiving brake pressure from the first brake control device and means for applying a corresponding brake pressure to the follower wheels, the corresponding brake pressure being less than a threshold pressure value, said proportioning device further including means for determining the threshold pressure value corresponding to a live load of the vehicle.

14. A wheel lock prevention system as set forth in claim 13, wherein each of the first, second, third and fourth brake control devices further includes an air master cylinder.

15. A wheel lock prevention system for a vehicle including a front axle having right and left front wheels, a first rear axle having right and left driving wheels, and a second rear axle having right and left follower wheels, the system comprising:

means for generating brake force;

a first brake control device for commonly controlling the brake force applied to said right and left front wheels;

a second brake control device for controlling the brake force applied to said right driving wheel;

a third brake control device for controlling the brake force applied to said left driving wheel;

a fourth brake control device for commonly controlling the brake force applied to said right and left follower wheels;

first and second detecting means for detecting the rotational speeds of said right and left front wheels, respectively;

third and fourth detecting means for detecting the rotational speeds of said right and left driving wheels, respectively;

fifth and sixth detecting means for detecting the rotational speeds of said right and left follower wheels, respectively;

a controller for receiving signals from each of said first, second, third, fourth, fifth, and sixth detecting means and for outputting corresponding control signals to the first, second, third, and fourth brake control devices; and a select-low circuit for receiving rotational speeds of the right and left front wheels through the first and second detecting means and for outputting a lower rotational speed of the right and left front wheels to the controller, the controller outputting a corresponding signal to the first brake control device.

* * * * *

UNITED STATES PATENT AND TRADEMARK OFFICE
CERTIFICATE OF CORRECTION

PATENT NO. : 5,456,526
DATED : October 10, 1995
INVENTOR(S) : Yoshihisa IWASA et al It is certified that error appears in the above-indentified patent and that said Letters Patent is hereby corrected as shown below:

Claim 11, Column 12, Line 60, after "each", insert --of--.

Signed and Sealed this

Twenty-ninth Day of October 1996

Attest:

BRUCE LEHMAN

*Attesting Officer*      *Commissioner of Patents and Trademarks*